Aug. 15, 1950 — A. E. ROY — 2,518,821
COMPOUND HYDRAULIC MASTER CYLINDER
Filed June 10, 1946 — 2 Sheets-Sheet 1
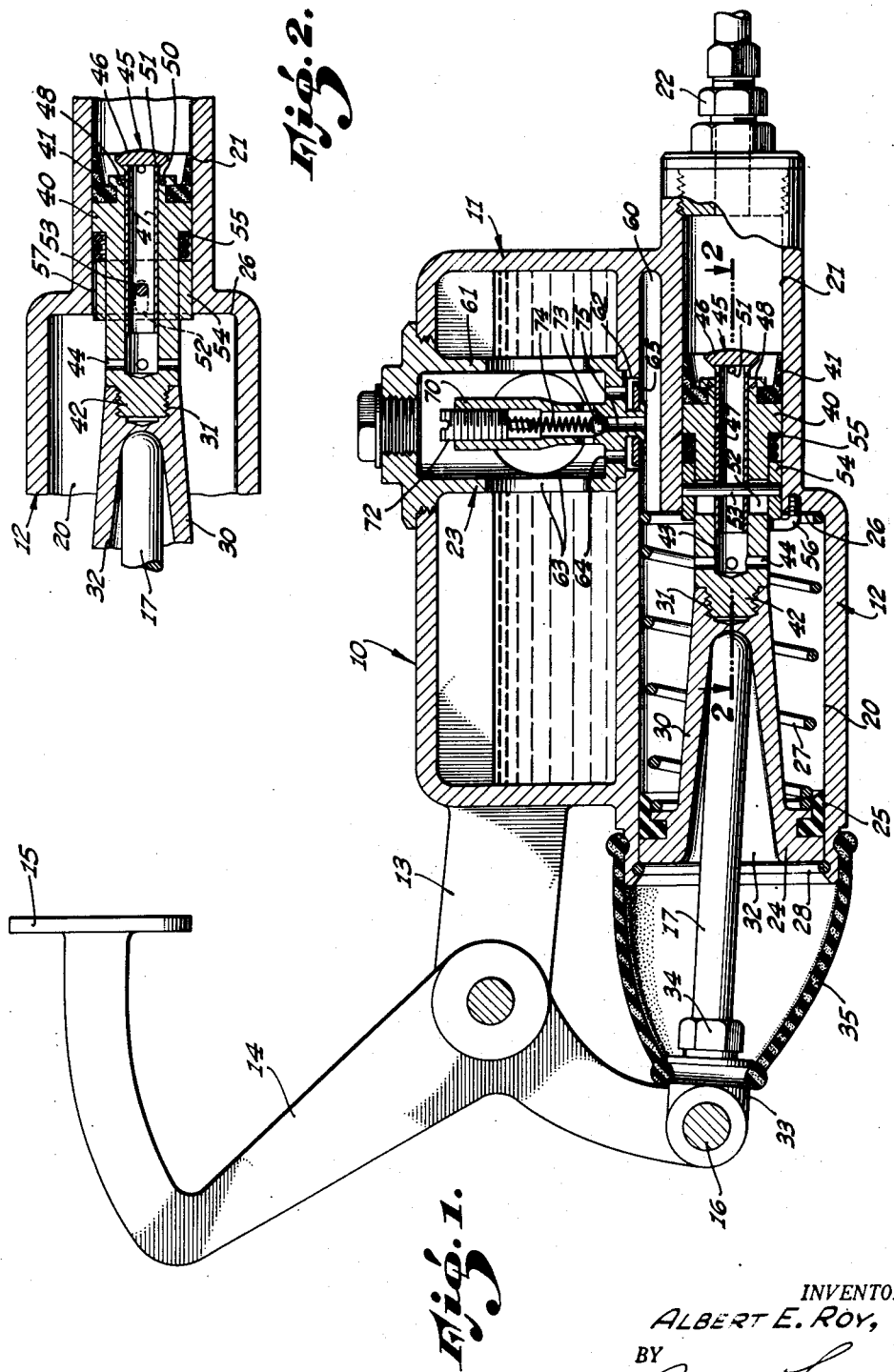
INVENTOR.
ALBERT E. ROY,
BY
ATTORNEY.

Aug. 15, 1950 — A. E. ROY — 2,518,821
COMPOUND HYDRAULIC MASTER CYLINDER
Filed June 10, 1946 — 2 Sheets-Sheet 2

INVENTOR.
ALBERT E. ROY,
BY
ATTORNEY.

Patented Aug. 15, 1950

2,518,821

UNITED STATES PATENT OFFICE 2,518,821

COMPOUND HYDRAULIC MASTER CYLINDER

Albert E. Roy, Burbank, Calif.

Application June 10, 1946, Serial No. 675,803

4 Claims. (Cl. 60—54.6)

My invention relates generally to hydraulic control systems, and more particularly to the so-called "master cylinder" of said systems, such as may be used to control the application of brakes on an automotive vehicle.

In the operation of many hydraulically controlled devices, such as the previously mentioned brakes of an automobile, it is necessary that a driven element be moved a certain distance before it produces any effect. In the case of automotive brakes, it is necessary that the brake shoes be moved outwardly until they engage the brake drum, at which time they will begin to do the work for which they were intended. The previous movement of the shoes may be termed a "lost motion" since it is analogous to a lost motion mechanical linkage. The amount of power required to move the shoes into contact with the drum is relatively small, though the actual movement of the shoes may be a considerable amount. For the first movement of the shoes, therefore, a relatively large amount of hydraulic fluid is required, and this may be at a relatively low pressure; whereas after the shoes have engaged the drum, the movement of the shoes is quite small but a considerable force must be exerted, and therefore a small amount of hydraulic fluid under a relatively high pressure is required. While all of the fluid might be supplied to the brake shoe operating mechanism at a relatively high pressure, this is unnecessary and at times even undesirable.

Instead, it has been found preferable to provide two rates of flow of hydraulic fluid to the brake operating or servo-mechanism, the first flow being of a relatively large quantity of fluid at a relatively low pressure to move the brake shoe into engagement with the brake drum, and then to provide a relatively small flow of fluid under a relatively high pressure. In this way, the operator is better able to "feel" the action of the brakes, and an excessively large movement of the brake pedal is not necessary.

Since the brake shoes will become worn in operation, the amount of fluid at a relatively low pressure necessary to move the shoes into contact with the brake drum will vary as the brakes are used over a period of time. The amount of low pressure fluid necessary to charge the brake operating mechanism, as distinguished from the high pressure fluid used to operate the brakes, will thus vary so that a device which always delivers a constant amount of charging fluid before delivering the operating fluid will be unsatisfactory.

It is therefore a major object of my invention to provide a master cylinder device which will provide a charge of fluid under relatively low pressure and of sufficient volume to move the brake shoes into contact with the brake drum.

It is another object of my invention to provide a device of this type in which the amount of charging fluid is determined by the operating requirements of the system.

A further object of my invention is to provide such a device which will furnish a supply of operating fluid under high pressure to operate the brakes after the system has been charged.

It is also an object of my invention to provide a hydraulic cylinder of the type described which has incorporated therein a valve system which insures that the cylinder will be maintained full of fluid at all times, and prevent the building up of excessive pressure therein which could damage the device and constitute a safety hazard.

It is a still further object of my invention to provide a device of this type which is simply and ruggedly constructed and which has very few operating parts which could tend to cause service and maintenance difficulties.

These and other objects and advantages of my invention will become apparent from the following description of a preferred form thereof, and from the drawings illustrating that form, in which:

Fig. 1 is a vertical cross sectional view of a master cylinder constructed in accordance with my invention, with the parts shown in their normal or unoperated positions;

Fig. 2 is a horizontal cross sectional view taken at 2—2 in Fig. 1 showing additional details of construction of the pressure regulator valve;

Figure 3:
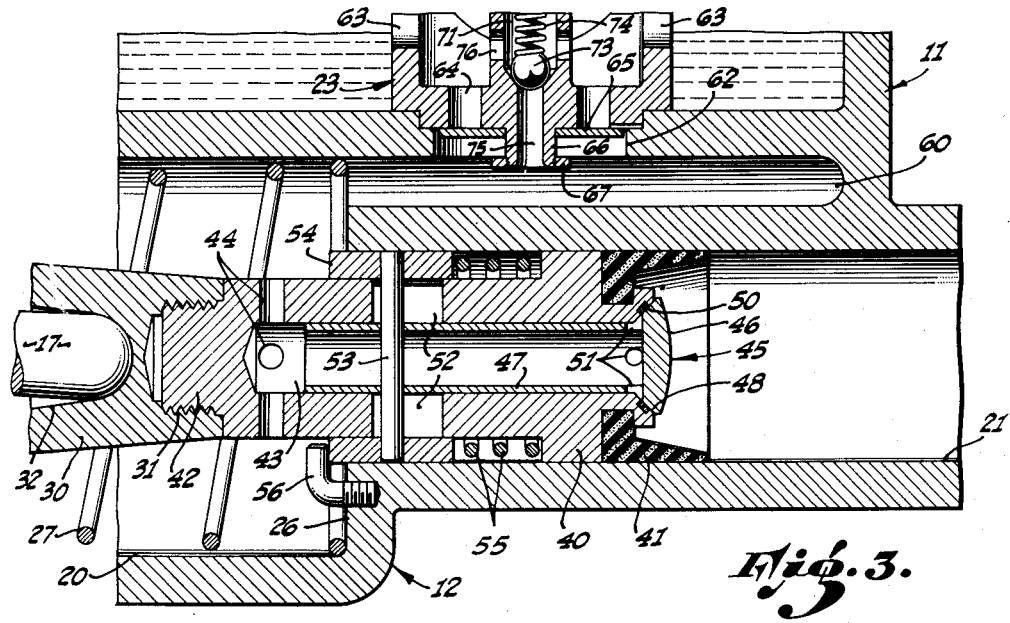
Fig. 3 is an enlarged cross sectional view of a portion of the parts shown in Fig. 1, showing the parts in the position they assume when the brake pedal is first moved to apply the brakes.

Referring now to the drawings and particularly to Fig. 1 thereof, the numeral 10 indicates generally a housing having an upper or reservoir section 11, and a lower or operating section 12. To provide a complete unit and for simplicity of alignment, the reservoir section 11 is preferably furnished with an ear 13 extending outwardly from its forward end, to which is pivotally attached a brake lever 14 having a brake pedal 15 at its upper end. The lower end of the brake lever 14 is provided with a pivotal connection 16 to which is attached a connecting rod 17, hereinafter described; and it will be apparent that as the brake pedal is moved forwardly, to the left in Fig. 1, the connecting rod will be moved rearwardly and toward the operating section 12.

The operating section 12 of the container 10 includes a pair of concentric cylindrical chambers 20 and 21, of which cylinder 20 is larger and supplies the charging fluid, while chamber 21 is smaller and provides the operating fluid. The chamber 21 is provided with a hydraulic coupling 22 by means of which connection may be made to the servo-mechanism (not shown) of the brakes; and the chamber 20 is fluid connected to the reservoir 11 through a make-up and relief valve assembly 23.

Slidably mounted in chamber 20 and closing the forward end thereof is a piston 24 having a sealing ring 25 of rubber or other resilient material around its periphery to prevent the escape of fluid from the chamber. A shoulder 26 is formed at the rear end of the chamber 20 by the reduction in size of the operation section 12 to provide for the smaller diameter of chamber 21; and a helical spring 27 bears against the shoulder 26 and the piston 24 to urge the latter forwardly. A snap ring 28 or other suitable holding means prevents the continued movement of the piston 24 and its ejection from the chamber 20.

Extending rearwardly from the piston 24 is a coaxial projection 30 which extends nearly to the shoulder 26 and is provided with a coaxial screw-threaded hole 31 at its rear end. The projection 30 is generally cylindrical in shape, and is provided with a generally conical recess 32 extending inwardly from the forward face of the cylinder 24 to receive the connecting rod 17. The rear end of the connecting rod 17 is generally hemispherical in shape, and the rearmost portion of the recess 32 is complementally shaped, to receive the connecting rod and act as a bearing surface for the end thereof. The forward end of the connecting rod 17 is provided with an attaching member 33 which connects to the pivotal connection 16; while an adjusting means 34 permits the effective length of the connecting rod to be varied so that the position of the brake lever 14 may be changed to meet varying conditions. A flexible cover 35 fits over the forward end of the operating section 12 and extends to the attaching member 33 so that dust, grease, and other foreign matter is kept from the piston 24.

Within the cylindrical chamber 21 is a piston 40 provided with a resilient sealing member 41 at its rear end. The forward end of piston 40 extends into the larger chamber 20 and is provided with a screw-threaded portion 42 which fits into and is held by the screw-threaded bore 31 in the projection 30. Piston 40 is thus attached to piston 24 and moves with the latter, and spring 27 urges both of the pistons to a forward position, where piston 24 is stopped by the retaining ring 28.

To permit the transfer of fluid from chamber 20 to chamber 21, piston 40 is provided with an axial bore 43 which extends forwardly from the rear end of the piston to a point just short of the threaded projection 42. Transverse holes 44 are bored through the piston 40 to permit fluid to enter the holes from chamber 20 and pass through them into the bore 43 and then into chamber 21.

As will later become apparent, it is not desirable that chamber 21 be open to chamber 20 at all times; and consequently I have provided a poppet type valve 45 which is adapted to shut off the fluid connection between the two chambers as the pistons are moved rearwardly and the pressure within chamber 21 approaches that in chamber 20. The valve 45 includes a valve head 46 and a hollow valve stem 47 which extends forwardly from the head within the bore 43. A valve seat 48 is formed in the rear end of piston 40; and a resilient insert 50 is mounted thereon to insure sealing of the valve when the valve head 46 bears against the valve seat. To permit fluid to pass through the bore 43 when the valve 45 is open, holes 51 are drilled through the valve stem 47 near the base of the head 46 so that an unobstructed flow of fluid may be had.

To urge the valve 45 to closed position, a slot 52 is formed in the piston 40 transversely to its axis, and a pin 53 is passed through it and the valve stem 47 so that the valve may move from open to closed position while the pin 53 travels within the confines of the slot. The outer ends of the pin 53 are held in a ring 54 which surrounds the forward end of the piston 40 and fits within the chamber 21, the ring being free to slide with respect to the piston and the walls forming the chamber. A spring 55 urges the ring forwardly and a stop 56 engages the forward edge of the ring to hold the latter so that the valve 45 is open when the pistons 24 and 40 are in their normal or unoperated positions. The ring 54 may be fitted loosely within chamber 21 or, preferably, a groove 57 may be formed in the ring to insure that the fluid pressure acting on the rear face of the ring is equal to that acting on the forward face.

Figure 4:
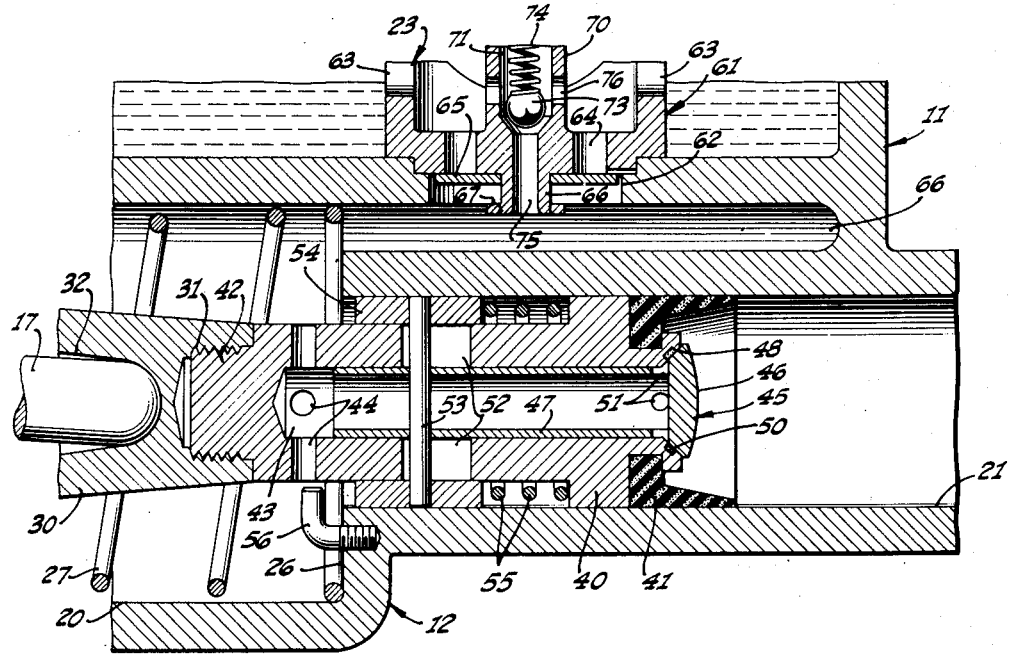
Fig. 4 is a cross sectional view similar to Fig. 3 showing the parts in the position they assume as the brake pedal is further depressed.

As seen in Fig. 1, valve 45 is thus held in open position by the stop 56 when the brake pedal 15 is released and the spring 27 has moved the pistons 24 and 40 to their forward limiting positions. As the brake pedal is then depressed, the pistons are then moved rearwardly, but the valve 45 cannot be completely closed until the piston 40 has moved a sufficient distance rearwardly to cause the valve seat 48 to bear against the valve head 46, held stationary by the spring 55 and the pin 53, as shown in Fig. 3. As later explained, the valve 45 is generally not closed at this time, unless the hydraulic line and servo-mechanism have been previously charged or filled. Further rearward movement of the pistons 24 and 40, tends to cause the valve 45 to be moved along with the piston 40, while maintaining the fluid connection between chambers 20 and 21 closed as shown in Fig. 4. As the brake pedal 15 is released, the cycle of operations is reversed, and the parts are returned to the positions shown in Fig. 1.

As previously mentioned, the chamber 20 is connected to the reservoir section 11 through the make up and relief valve 23, and in the device shown in Fig. 1, an extension 60 of the chamber 20 extends rearwardly above the chamber 21 to permit the valve 23 to be located so it will not be subject to interference from the spring 27 or the piston 24.

In order that the chamber 20 may be kept full of fluid at all times, a make up valve is provided which permits fluid to drain from the reservoir 11 into the extension 60 and thence into the chamber 20 when the brake pedal 15 is not depressed. The make up valve shown includes a housing 61 which preferably extends from the top of the reservoir section 11, where it is screw-threadedly attached to the top thereof, extending downwardly and seating with a fluid tight seal in a hole 62 which extends between the reservoir 11 and the extension 60. The housing 61 is provided with a plurality of openings 63 which permit the fluid within the housing 61 to be maintained at the same level as that within the reservoir 11. In the base of the housing 61 are a plurality of openings 64 grouped around the axis of the housing and adapted to permit the flow of fluid from the reservoir into the extension 60. A plate 65 is adapted to cover the lower end of these holes when the pressure within the extension 60 exceeds that within the reservoir 11; and the plate is held to housing 61 by means of a stem 66 having a shoulder 67 attached to the lower end thereof. The plate 65 is of somewhat smaller diameter than the hole 62, and is slidably mounted upon the stem 66 so that in its normal position, as shown in Fig. 1, the plate is in its lowermost position against the shoulder 67 and hydraulic fluid may pass through the openings 64 and around the plate 65 into the extension 60. When the pressure within the extension 60 increases above that in the reservoir 11, the plate 65 is urged upwardly to bear against the bottom of the housing 61 and close the holes 64 to prevent the reverse movement of fluid through the latter. This position of the plate 65 is shown in Figs. 3 and 4.

As piston 24 is moved further rearwardly, the pressure within extension 60 becomes higher than that necessary to close the aperture 64, and if continued without release, could either stop the movement of brake pedal 15 or damage the operating section 12 of the housing 19. To prevent either of these occurrences from happening, a relief valve is incorporated within the housing 61. The relief valve includes a stem 70 extending upwardly from the bottom of the housing 61 and concentric with the stem 66 which extends downwardly from that bottom. The stem 70 is hollow and is provided with internal screw threads at its upper end so that a plug 72 may be inserted and held therein. At its lower end, the hole 71 is provided with a hemispherical portion into which a ball 73 may fit and be seated, being held against the hemispherical portion by a spring 74 extending between the ball bearing and the plug 72. A hole 75 extends upwardly through the stem 66 to join the hole 71, the ball 73 seating on the hole 75 and closing the latter until the pressure within the chamber 60 becomes sufficient to urge the ball upwardly against the urging of the spring 74. Holes 76 near the base of stem 70 permit the fluid so traveling upward through hole 75 to return to the reservoir 11 where it may again be used. The normal position of the relief valve is shown in Fig. 1, and its position, when the pressure within extension 60 is sufficient to move the ball 73 upwardly against the urging of spring 74, is shown in Fig. 4. The make up and relief valve assembly 23 just described thus maintains the chamber 20 and the extension 60 filled with fluid at all times, and permits a pressure to be built up within the chamber while at the same time preventing the building up of excessive pressure within the chambers which would tend to damage them.

*Operation*

To operate the device, assuming that a hydraulic servo-mechanism is connected through suitable hydraulic tubing to the coupling 22, the brake pedal 15 is pressed forwardly, thereby rotating the brake lever 14 and moving the connecting rod 17 inwardly and collapsing the dust cover 35. The piston 24 is moved rearwardly into the chamber 20, against the urging of spring 27, and forces hydraulic fluid through the holes 44, bore 43, and through the valve 45 into the chamber 21. Since the volume of fluid displaced by the piston 24 for a given longitudinal movement thereof is relatively large, there will be a relatively large flow of fluid through the valve 45, the chamber 21, and into the hydraulic line and servo-mechanism to move the brake shoes into contact with the brake drum. Piston 40 being attached to piston 24 moves with the latter, and this will tend to cause the valve 45 to be closed as previously described and shown in Fig. 3, though its actual closing will be slightly delayed, as hereinafter described.

The movement of piston 24 which has increased the pressure of the hydraulic fluid within chamber 20 to force the fluid through valve 45, has also increased the pressure in the extension 60 of chamber 20 and forced plate 65 upwardly against the lower portion of housing 61 to close the aperture 64 so that until such time as the relief valve operates, the pressure within chamber 20 is increased. This increased pressure is transmitted by the hydraulic fluid through the valve stem 47 to the valve head 46, urging it rearwardly. The frictional resistance which the valve 45 offers to the movement of fluid will tend to cause the pressure within chamber 21 to be less than that in chamber 20 while the hydraulic line and servo-mechanism are being charged, since a relatively large volume of fluid is being transferred from chamber 20 to chamber 21 during this time. As a result, the force exerted by the fluid on the forward surface of valve head 46 (the left hand surface in the drawings) will be sufficiently greater than that exerted on the rear surface of the valve head to overcome the force exerted by the spring 55, and the valve 45 therefore remains open until the hydraulic line and servo-mechanism are fully charged.

When the charging of the hydraulic line and servo-mechanism has been completed, the movement of fluid from chamber 20 to chamber 21 is materially reduced, and the pressures within these chambers tend to equalize, permitting the spring 55 to close valve 45, and thereby stop any further movement of fluid from chamber 20 to chamber 21. Thereafter, any further movement rearwardly of the connecting rod 17 produces a very material increase in the pressure within both the chambers 20 and 21. When this occurs, the pressure within the extension 60 is likewise increased until it becomes sufficient to raise the ball 73 and permit the hydraulic fluid within the chamber 20 to be returned to the reservoir 11. As the connecting rod 17 then moves rearwardly, the fluid within chamber 21 is forced through the coupling 22 and into the hydraulic line to operate the servo-mechanism and force the brake shoes against the brake drum.

When it is desired to release the brakes, pressure is removed from the brake pedal 15 and the spring 27 moves the piston 24 forwardly, permitting the ball 73 to be returned to its normal position and the plate 65 to move downwardly away from the aperture 64. Piston 44 is likewise moved forwardly, and the pressure of the hydraulic fluid within the line and servo-mechanisms is reduced so that the usual return mechanism of the servo-mechanism may return the latter to its normal position with the brake shoes spaced apart from the drum. Valve 45 remains closed as piston 40 returns to its normal position until such time as ring 54 bears against stop 56, whereupon the valve ceases moving while the piston completes its return to normal position as valve 45 opens.

Should it be desired to reapply the brakes before piston 40 has reached its normal position and valve 45 has opened, it is only necessary to again apply pressure to the brake pedal 15, and the brakes will again be operated without the addition of any charging fluid to the line, since none of the fluid within the chamber 21, the hydraulic line, or the servo-mechanism has been returned to chamber 20 or to the reservoir until such time as the valve 45 is opened. If the pedal 15 has been completely released and the valve 45 has opened, all of the parts are in their normal position as shown in Fig. 1 and the operation of reapplying the brakes is the same as that previously described.

It will thus be seen that I have provided a hydraulic master cylinder of very simple construction and superior operation. The operation of the piston 24 within the chamber 20 is such as to charge the hydraulic line and servo-mechanism rapidly, and thereafter the movement of piston 40 within chamber 21 provides the necessary operating force to operate the servo-mechanism without the application of an excessively large force on the brake pedal 15.

While I have shown and described a preferred form of my invention, I do not wish to be limited to the particular form or arrangement of parts herein described and shown, except as limited by my claims.

I claim:

1. In a hydraulic pressure device having a reservoir, a low pressure cylinder fluid connectable to the reservoir, and a high pressure cylinder concentric with the low pressure cylinder, a piston in the high pressure cylinder which includes: a valve adapted to control a fluid connection extending through said piston to said low pressure cylinder, said valve having a valve head and a hollow valve stem, with the surface of said head adjacent said stem being exposed to the fluid pressure within said low pressure cylinder, and the opposite surface of said head being exposed to the fluid pressure within said high pressure cylinder, said stem having fluid outlets formed therethrough at the base of said head; spring means connected between said piston and said valve to urge the latter to closed position, said valve thereby closing said fluid connection between said low pressure cylinder and said high pressure cylinder; and stop means adapted to engage said spring means as said piston is moved outwardly from said high pressure cylinder whereby said valve is opened as said piston approaches its outermost position.

2. In a hydraulic pressure device having a reservoir, a low pressure cylinder fluid connectable to the reservoir, and a high pressure cylinder concentric with the low pressure cylinder, a piston in the high pressure cylinder which includes: a poppet type valve adapted to control a fluid connection extending through said piston from said low pressure cylinder to said high pressure cylinder; slidable means mounted on said piston; a spring connected between said piston and said slidable means and urging the latter away from said high pressure cylinder; means connecting said valve to said slidable member, whereby the urging of said spring tends to close said valve; and stop means adapted to engage said slidable means and hold it against further movement with said piston as the latter approaches its outermost position with respect to said high pressure cylinder, whereby said valve is opened as said piston approaches said outermost position.

3. In a hydraulic pressure device having a reservoir, a low pressure cylinder fluid connectable to the reservoir, and a high pressure cylinder concentric with the low pressure cylinder, a piston in the high pressure cylinder which includes: a poppet type valve adapted to control a fluid connection extending through said piston from said low pressure cylinder to said high pressure cylinder; a ring slidably mounted on said piston and movable therewith within said cylinder; a pin extending through said piston to connect the stem of said valve to said ring, whereby said valve and said ring move as a unit, said piston having a slot therein to receive said pin and permit its reciprocable movement with respect to said piston; a spring connected between said piston and said ring urging the latter away from said high pressure cylinder, whereby said valve is urged to closed position; and stop means adapted to engage said ring and hold it against further movement with said piston as the latter approaches its outermost position with respect to said high pressure cylinder, whereby said valve is opened as said piston approaches said outermost position.

4. In a hydraulic pressure device having a reservoir, a low pressure cylinder fluid connectable to the reservoir, and a high pressure cylinder concentric with the low pressure cylinder, a piston in the high pressure cylinder which includes: a valve seat in the end of said piston within said high pressure cylinder, said valve seat surrounding a passageway within said piston extending between said low pressure and said high pressure cylinders; a valve head adapted to cooperate with said valve seat; a hollow valve stem attached to said valve head and extending into said passageway, said valve stem having a hole formed therein at the base of said valve head whereby the face of said valve head adjacent said valve stem is subjected to the fluid pressure within said low pressure cylinder, and the opposite face of said valve head is subjected to the fluid pressure within said high pressure cylinder; a ring surrounding said piston within said cylinder and slidable with respect to both said piston and said cylinder; a pin extending through said piston to connect said valve stem to said ring so that said ring and stem move as a unit, said piston having a slot therein to permit reciprocable movement of said pin with respect to said piston; a spring extending between said ring and said piston urging said ring away from said high pressure cylinder, whereby said valve is urged to a closed position; and a stop adapted to engage said ring and prevent its movement away from said high pressure cylinder as said piston approaches its outermost position with respect to said high pressure cylinder, whereby said valve is open when said piston is in said outermost position.

ALBERT E. ROY.

REFERENCES CITED

The following references are of record in the file of this patent:

UNITED STATES PATENTS

| Number | Name | Date |
| --- | --- | --- |
| 1,709,150 | Pieper | Apr. 16, 1929 |
| 2,191,716 | Hunt | Feb. 27, 1940 |
| 2,727,316 | Bowen | Feb. 10, 1942 |
| 2,301,599 | Whitten | Nov. 10, 1942 |